(12) United States Patent
Fyne (10) Patent No.: US 6,614,904 B1
(45) Date of Patent: Sep. 2, 2003

(54) APPARATUS AND METHOD FOR EFFECTING A COMMUNICATION ARRANGEMENT BETWEEN SWITCH ARRAYS

(75) Inventor: James Robert Fyne, Blue Ridge, TX (US)

(73) Assignee: Alcatel, Paris (FR)

( * ) Notice: Subject to any disclaimer, the term of this patent is extended or adjusted under 35 U.S.C. 154(b) by 534 days.

(21) Appl. No.: 09/634,405

(22) Filed: Aug. 9, 2000

(51) Int. Cl.$^7$ .......................... H04M 3/00; H04M 7/00; H04Q 3/00
(52) U.S. Cl. ............. 379/271; 379/220.01; 379/221.01; 379/272; 379/273; 379/279; 379/291; 379/306; 340/2.22; 340/2.23; 340/2.27; 340/2.28
(58) Field of Search ............................ 340/825, 825.01, 340/2.1, 2.2, 2.21, 2.22, 2.23, 2.27, 2.28; 379/219, 220.01, 221.01, 221.03, 221.04, 268, 269, 270, 271, 272, 273, 279, 291, 292, 306

(56) References Cited

U.S. PATENT DOCUMENTS

| | | | | |
|---|---|---|---|---|
| 3,701,112 A | * | 10/1972 | Hagelbarger ................. 370/372 |
| 3,792,439 A | * | 2/1974 | Auspurg et al. ............. 379/219 |
| 3,816,668 A | * | 6/1974 | Giesken ....................... 379/273 |
| 3,842,214 A | * | 10/1974 | Altenburger et al. ....... 340/2.71 |
| 3,851,124 A | * | 11/1974 | Garavaila .................... 340/2.21 |
| 3,943,299 A | * | 3/1976 | Moriyama et al. ........... 379/326 |
| 4,009,351 A | * | 2/1977 | Hofstetter ................... 340/2.24 |
| 4,038,638 A | * | 7/1977 | Hwang ......................... 340/2.22 |
| 4,079,207 A | * | 3/1978 | Ueda et al. ................... 340/2.25 |
| 4,173,713 A | * | 11/1979 | Giesken et al. ............. 370/374 |
| 4,197,427 A | * | 4/1980 | Hutcheson et al. ......... 379/133 |
| 4,605,928 A | * | 8/1986 | Georgiou .................... 340/2.25 |
| 4,706,150 A | * | 11/1987 | Lebizay et al. ........... 340/825.5 |
| 4,754,478 A | * | 6/1988 | Leibersberger et al. 379/204.01 |
| 4,983,961 A | * | 1/1991 | Brunle et al. ............... 340/2.22 |
| 5,103,220 A | * | 4/1992 | Brunle ........................ 340/2.22 |
| 5,317,310 A | * | 5/1994 | Bowdon ...................... 340/2.22 |
| 5,325,089 A | * | 6/1994 | Goeldner .................... 340/2.25 |
| 5,325,090 A | * | 6/1994 | Goeldner .................... 340/2.22 |
| 5,408,231 A | * | 4/1995 | Bowdon ...................... 340/2.22 |
| 5,471,460 A | * | 11/1995 | Tanabe ........................ 370/218 |
| 5,548,639 A | * | 8/1996 | Ogura et al. ........... 379/221.04 |
| 5,805,691 A | * | 9/1998 | Dendi .................... 379/221.01 |
| 5,889,775 A | * | 3/1999 | Sawicz et al. .............. 370/360 |
| 6,377,543 B1 | * | 4/2002 | Grover et al. .............. 370/227 |

* cited by examiner

Primary Examiner—Harry S. Hong
(74) Attorney, Agent, or Firm—Law Offices of Don Mondul; Jessica W. Smith; V. Lawrence Sewell (57) ABSTRACT

An apparatus is disclosed for effecting a communication arrangement of a plurality of communication circuits between first connection loci of a first switch array and second connection loci of a second switch array. The apparatus comprises: (a) a first connection interface with the first switch array having first interconnection loci; (b) a second connection interface with the second switch array having second interconnection loci; (c) a plurality of communication paths at least equal in number to the plurality of communication circuits intermediate the first and second connection interfaces; (d) a first router connected with the first switch array and connection interface; and (e) a second router connected with the second switch array and connection interface. The first and second router interfaces cooperate to effect a plurality of routing connections among the first connection loci, the second connection loci and selected communication paths to establish the communication arrangement. The method comprises the steps of: (a) providing the first and second connection interfaces, first and second switch arrays and first and second interconnection loci; (b) providing communication paths at least equal in number to the communication circuits intermediate the first and second connection interfaces; (c) providing first and second router interfaces connecting respective first and second switch arrays and the first and second connection interfaces; and (d) configuring the first and second router interfaces to effect routing connections among the first and second connection loci and selected communication paths to establish the communication arrangement.

18 Claims, 4 Drawing Sheets

APPARATUS AND METHOD FOR EFFECTING A COMMUNICATION ARRANGEMENT BETWEEN SWITCH ARRAYS

BACKGROUND OF THE INVENTION

The present invention is directed to communication network switching arrangements. In complex communication switching networks it is often necessary to provide long duration time frames for maintenance. This is especially so in the event that a network is being expanded to handle a greater volume of switching over a greater number of connections. There is a significant amount of time required for purposes of moving connection cables, or adding cables, or both moving and adding cables to accommodate the required growth. During the time that such connections are being added or moved switch matrix redundancy is lost and, as a consequence, switch matrix survivability is lost. There is an additional concern that accompanies any opening of an in-field operational system: any such opening presents an opportunity for human error or otherwise inadvertently causing system problems that may seriously affect traffic handling or other operational parameters.

In today's environment, customers building a communication system are required to select from a few predetermined switch matrix sizes. As a consequence, to accommodate future growth and avoid long-duration interruptions to equip to handle the growth when it occurs, customers are often required to purchase an initial switching setup that exceeds—and may far exceed—their initial needs. Following such an approach, a customer building a communication system may design and outfit the system for its largest size in order to accommodate expected future growth. However, such a solution involves purchasing and installing switching elements that will not be utilized until the hoped-for growth materializes. This is an expensive impractical solution because such an outfitting beyond one's needs is a costly requirement in the communication industry. There are further significant costs associated with the employment of field personnel to make cabling connection changes each time a switch matrix must be expanded.

It would be advantageous to provide a way to reduce the duration of time required for providing expanded switching functionality to accommodate system growth.

SUMMARY OF THE INVENTION

An apparatus is disclosed for effecting a communication arrangement between a first switch array having a plurality of first connection loci and a second switch array having a plurality of second connection loci. The communication arrangement is a plurality of communication circuits intermediate first selected connection loci of the plurality of first connection loci and second selected connection loci of the plurality of second connection loci. The apparatus preferably comprises: (a) a first connection interface associated with the first switch array, the first connection interface has a plurality of first interconnection loci; (b) a second connection interface associated with the second switch array, the second connection interface has a plurality of second interconnection loci; (c) a plurality of communication paths intermediate the first connection interface and the second connection interface, the plurality of communication paths is at least equal in number to the plurality of communication circuits; (d) a first router interface connected with the first switch array and the first connection interface; and (e) a second router interface connected with the second switch array and the second connection interface. The first router interface and the second router interface cooperate to effect a plurality of routing connections among the first selected connection loci, the second selected connection loci and selected communication paths of the plurality of communication paths to establish the communication arrangement.

The method preferably comprises the steps of: (a) providing a first connection interface associated with the first switch array, the first connection interface having a plurality of first interconnection loci; (b) providing a second connection interface associated with the second switch array, the second connection interface having a plurality of second interconnection loci; (c) providing a plurality of communication paths intermediate the first connection interface and the second connection interface, the plurality of communication paths being at least equal in number to the plurality of communication circuits; (d) providing a first router interface connected with the first switch array and the first connection interface; (e) providing a second router interface connected with the second switch array and the second connection interface; and (f) configuring the first router interface and the second router interface to cooperate to effect a plurality of routing connections among the first selected connection loci, the second selected connection loci and selected communication paths of the plurality of communication paths to establish the communication arrangement.

The preferred embodiment of the present invention teaches using a fully-wired system based upon the number of equipment shelves installed. This provides an increased number of data links, or communication connections that are available for future use. The connection to selected data links is controlled by router modules (or router cards router interfaces) between switching elements and shelf backplanes, or connection interfaces. By fully wiring all installed switching matrix shelves, one provides an ability to grow, or expand to the limits of the extant shelf capacity. Additional active data links between switching elements are selectively established by router modules connecting switching connection loci with interconnection loci associated with individual cables, or communication paths as needed. No rerouting or additional connection of cables is required for expansion. All that is needed is a replacement router element, or router card to reestablish a new connection to accommodate installation of new switching elements. Such router card replacement may be carried out from front panel locations, thereby obviating any need to enter the interior of cabling connection areas and shutting down the switching operations. Router card replacement may be effected in moments, thereby eliminating extended duration down-times presently involved in cable moving and cable installation.

The present invention is not limited to hard-wired implementations of communication paths or connections, such as electrical or coaxial cables. The teachings of the present invention apply as well to other communication systems, such as optical systems, including fiber optic cable systems and directly optically linked laser systems not involving fiber optic cabling.

It is, therefore, an object of the present invention to provide an apparatus and method for effecting a communication arrangement between a first switch array and a second switch array that significantly reduce time required for rearranging connections between switch arrays.

Further objects and features of the present invention will be apparent from the following specification and claims when considered in connection with the accompanying drawings, in which like elements are labeled using like reference numerals in the various figures, illustrating the preferred embodiments of the invention.

DETAILED DESCRIPTION OF THE PREFERRED EMBODIMENT

Figure 1:
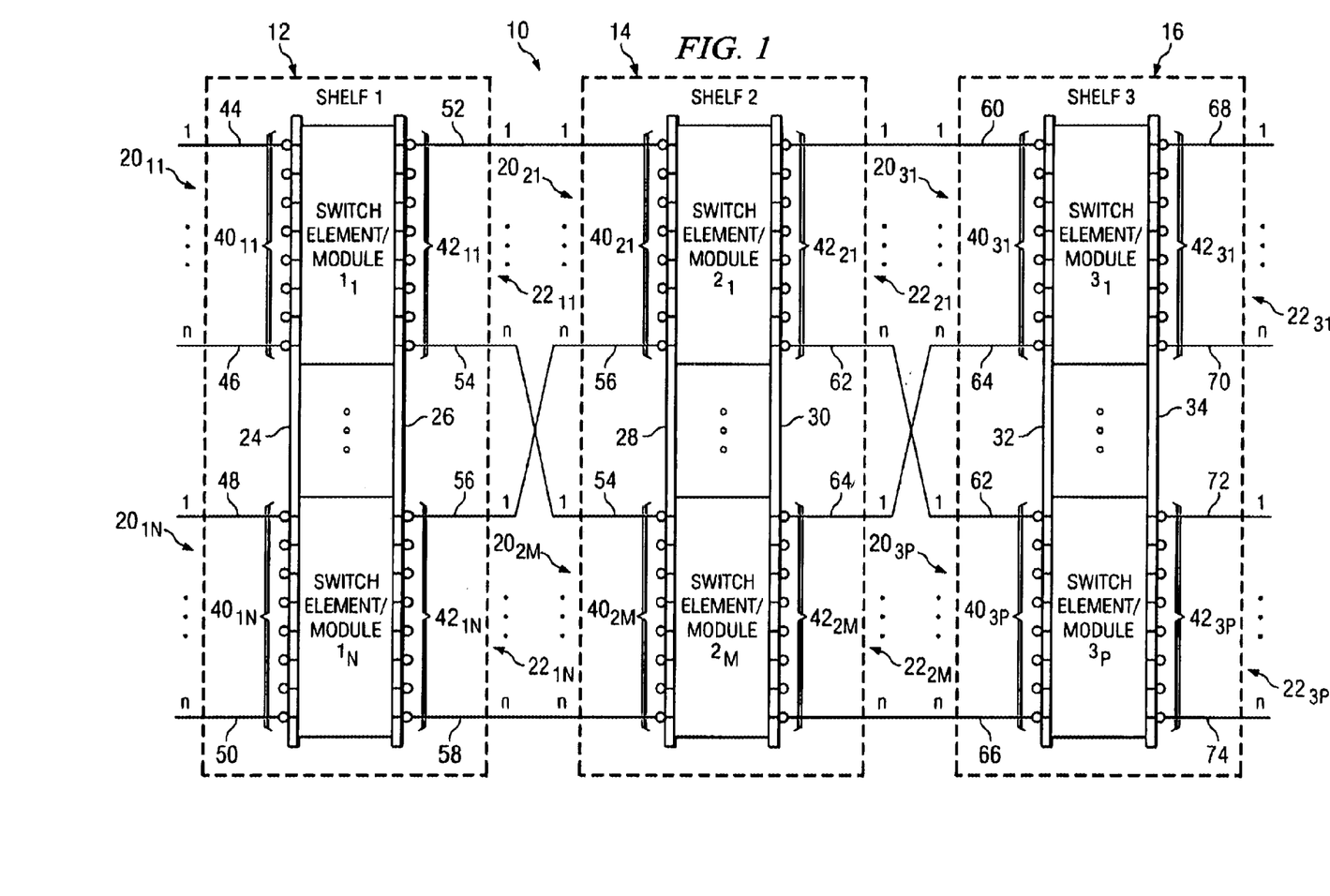
FIG. 1 is a schematic diagram illustrating the environment in which the present invention may be advantageously employed.

FIG. 1 is a schematic diagram illustrating the environment in which the present invention may be advantageously employed. In FIG. 1, a communication switching network 10 includes a first switching system 12 situated in a shelf 1, a second switching system 14 situated in a shelf 2 and a third switching system 16 situated in a shelf 3.

First switching system 12 includes a number "N" switch elements, indicated by switch element $1_1$ through switch element $1_N$. Second switching system 14 includes a number "M" switch elements, indicated by switch element $2_1$ through switch element $2_M$; Third switching system 16 includes a number "P" switch elements, indicated by switch element $3_1$ through switch element $3_P$. Each of switch elements $1_1$ through $1_N$ has a first plurality of connection arrays $20_{11}$ through $20_{1N}$ and a second plurality of connection arrays $22_{11}$ through $22_{1N}$. Each of switch elements $2_1$ through $2_M$ has a first plurality of connection arrays $20_{21}$ through $20_{2M}$ and a second plurality of connection arrays $22_{21}$ through $22_{2M}$. Each of switch elements $3_1$ through $3_P$ has a first plurality of connection arrays $20_{31}$ through $20_{3P}$ and a second plurality of connection arrays $22_{31}$ through $22_{3P}$.

For purposes of explanation, one may presume that signals proceed from left to right in FIG. 1. In such case, connection arrays 20 are input connection arrays and connection arrays 22 are output connection arrays. In that case, connection arrays $20_{11}$ through $20_{1N}$ are input connection arrays for switch elements $1_1$ through $1_N$; connection arrays $20_{21}$ through $20_{2M}$ are input connection arrays for switch elements $2_1$ through $2_M$; and connection arrays $20_{31}$ through $20_{3P}$ are input connection arrays for switch elements $3_1$ through $3_P$. Connection arrays $22_{11}$ through $22_{1N}$ are output connection arrays for switch elements $1_1$ through $1_N$; connection arrays $22_{21}$ through $22_{2M}$ are output connection arrays for switch elements $2_1$ through $2_M$; and connection arrays $22_{31}$ through $22_{3P}$ are output connection arrays for switch elements $3_1$ through $3_P$.

Each input connection array 20 and output connection array 22 is carried in a connection interface, or backplane. Input connection arrays $20_{11}$ through $20_{1N}$ are carried in a backplane 24. Output connection arrays $22_{11}$ through $22_{1N}$ are carried in a backplane 26. Input connection arrays $20_{21}$ through $20_{2M}$ are carried in a backplane 28. Output connection arrays $22_{21}$ through $22_{2M}$ are carried in a backplane 30.

Input connection arrays $20_{31}$ through $20_{3P}$ are carried in a backplane 32. Output connection arrays $22_{31}$ through $22_{3P}$ are carried in a backplane 34. Preferably each backplane 24, 26, 28, 30, 32, 34 is configured to carry all input connection arrays 20 for a given shelf or carry all output connection arrays 22 for a given shelf.

Each connection array 20, 22 includes a plurality of connection loci. There are a number "n" connection loci for each connection array 20, 22 in FIG. 1. The number "n" of connection loci need not be the same for each connection array 20, 22. In order to avoid cluttering FIG. 1, only one representative connection locus is labeled for each connection array 20, 22. Accordingly, FIG. 1 illustrates a representative input connection locus $40_{11}$ included in input connection array $20_{11}$ and a representative input connection locus $40_{1N}$ included in input connection array $20_{1N}$. Other switch modules in switching system 12 in shelf 1 (not shown in FIG. 1) will have similar arrays of input connection loci $40_{1x}$. A representative output connection locus $42_{11}$ is included in output connection array $22_{11}$ and a representative output connection locus $42_{1N}$ is included in output connection array $22_{1N}$. Other switch modules in switching system 12 in shelf 1 (not shown in FIG. 1) will have similar arrays of output connection loci $42_{1x}$.

A representative input connection locus $40_{21}$ is included in input connection array $20_{21}$ and a representative input connection locus $40_{2M}$ is included in input connection array $20_{2M}$. Other switch modules in switching system 14 in shelf 2 (not shown in FIG. 1) will have similar arrays of input connection loci $40_{2x}$. A representative output connection locus $42_{21}$ is included in output connection array $22_{21}$ and a representative output connection locus $42_{2M}$ is included in output connection array $22_{2M}$. Other switch modules in switching system 14 in shelf 2 (not shown in FIG. 1) will have similar arrays of output connection loci $42_{2x}$.

A representative input connection locus $40_{31}$ is included in input connection array $20_{31}$ and a representative input connection locus $40_{3P}$ is included in input connection array $20_{3P}$. Other switch modules in switching system 16 in shelf 3 (not shown in FIG. 1) will have similar arrays of input connection loci $40_{3x}$. A representative output connection locus $42_{31}$ is included in output connection array $22_{31}$ and a representative output connection locus $42_{3P}$ is included in output connection array $22_{3P}$. Other switch modules in switching system 16 in shelf 3 (not shown in FIG. 1) will have similar arrays of output connection loci $42_{3x}$.

In representative communication switching network 10 illustrated in FIG. 1 only selected connections between switching systems 12, 14 and between switching systems 14, 16 are shown. One skilled in the art will understand that communication switching network 10 may include complex and numerous connections. It is sufficient to note here that communication switching network 10 is connected, or wired to accommodate the extant switching requirement for which network 10 is designed and employed. Thus, input cable 44 is connected with input connection locus number "1" of input connection loci $40_{11}$ and input cable 46 is connected with input connection locus number "n" of input connection loci $40_{11}$. Input cable 48 is connected with input connection locus number "1" of input connection loci $40_{1N}$ and input cable 50 is connected with input connection locus number "n" of input connection loci $40_{1N}$.

Interconnecting cable 52 effects interconnection between first switching system 12 in shelf 1 and second switching system 14 in shelf 2. Interconnecting cable 52 is connected with output connection locus number "1" of output connection loci $42_{1X}$ (shelf 1) and with input connection locus number "1" of input connection loci $40_{21}$ (shelf 2). Interconnecting cable 54 further effects interconnection between first switching system 12 in shelf 1 and second switching system 14 in shelf 2. Interconnecting cable 54 is connected with output connection locus number "n" of output connection loci $42_{11}$ (shelf 1) and with input connection locus number "1" of input connection loci $40_{2M}$ (shelf 2). Interconnecting cable 56 further effects interconnection between first switching system 12 in shelf 1 and second switching system 14 in shelf 2. Interconnecting cable 56 is connected with output connection locus number "1" of output connection loci $42_{1N}$ (shelf 1) and with input connection locus number "n" of input connection loci $40_{21}$ (shelf 2). Interconnecting cable 58 further effects interconnection between first switching system 12 in shelf 1 and second switching system 14 in shelf 2. Interconnecting cable 58 is connected with output connection locus number "n" of output connection loci $42_{1N}$ (shelf 1) and with input connection locus number "n" of input connection loci $40_{2M}$ (shelf 2).

Interconnecting cable 60 effects interconnection between second switching system 14 in shelf 2 and third switching system 16 in shelf 3. Interconnecting cable 60 is connected with output connection locus number "1" of output connection loci $42_{21}$ (shelf 2) and with input connection locus number "1" of input connection loci $40_{31}$ (shelf 3). Interconnecting cable 62 further effects interconnection between second switching system 14 in shelf 2 and third switching system 16 in shelf 3. Interconnecting cable 62 is connected with output connection locus number "n" of output connection loci $42_{21}$ (shelf 2) and with input connection locus number "1" of input connection loci $40_{3P}$ (shelf 3). Interconnecting cable 64 further effects interconnection between second switching system 14 in shelf 2 and third switching system 16 in shelf 3. Interconnecting cable 64 is connected with output connection locus number "1" of output connection loci $42_{2M}$ (shelf 2) and with input connection locus number "n" of input connection loci $40_{31}$ (shelf 3). Interconnecting cable 66 further effects interconnection between second switching system 14 in shelf 2 and third switching system 16 in shelf 3. Interconnecting cable 66 is connected with output connection locus number "n" of output connection loci $42_{2M}$ (shelf 2) and with input connection locus number "n" of input connection loci $40_{3P}$ (shelf 3).

Output cable 68 is connected with output connection locus number "1" of output connection loci $42_{31}$ and output cable 70 is connected with output connection locus number "n" of output connection loci $42_{31}$. Output cable 72 is connected with output connection locus number "1" of output connection loci $42_{3P}$ and output cable 74 is connected with output connection locus number "n" of output connection loci $42_{3P}$.

If any growth is experienced requiring expansion of network 10 to include additional new switch elements/modules, then service personnel must go behind switching shelves, remove access panels and physically connect or reconnect cable assemblies to accommodate the new switch elements/modules. As mentioned hereinbefore, reconnection of cables and addition of cables involved in such an expansion operation involves significant down time for a switching network.

Figure 2:
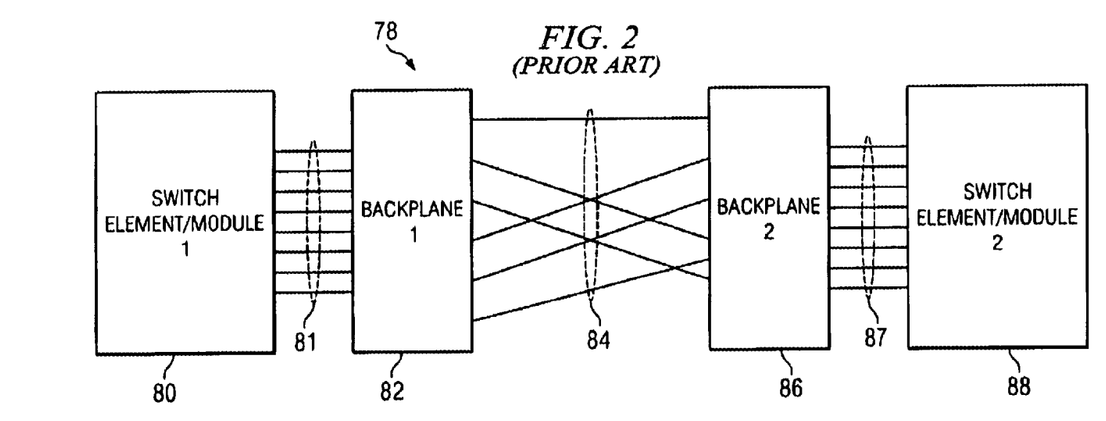
FIG. 2 is a simplified schematic diagram illustrating a prior art apparatus.

FIG. 2 is a simplified schematic diagram illustrating a prior art apparatus. In FIG. 2, a switching network 78 includes a first switch element/module 80 connected by wired or pin connectors 81 with a first backplane 82. First backplane 82 is connected by a collection of cable connectors 84 with a second backplane 86. Second backplane 86 is connected by wired or pin connectors 87 with a second switch element/module 88. Connectors 81, 87 and collection of cable connectors 84 are installed for the extant application for which switching network 78 is designed and employed. Any changes to switching network 78—for growth or expansion, or for another reason—must be accommodated by reestablishing or reorienting collection of cable connectors 84 as needed. Such reestablishing may include rerouting cables, or adding new cables, or both rerouting and adding cables.

Figure 3:
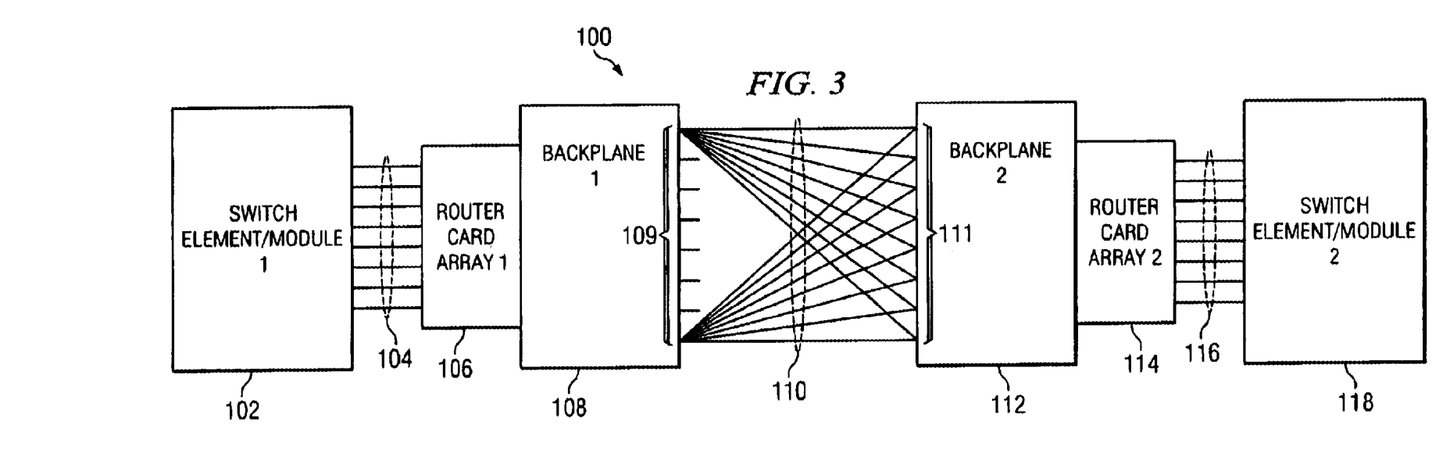
FIG. 3 is a simplified schematic diagram illustrating the apparatus of the present invention.

FIG. 3 is a simplified schematic diagram illustrating the apparatus of the present invention. In FIG. 3, a switching network 100 includes a first switch element/module 102 connected by wire or pin connectors 104 with a router interface 106. Router interface 106 is connected with a first backplane 108. First backplane 108 has a plurality of connection loci 109 by which first backplane 108 is connected by cable connections 110 with connection loci 111 of a second backplane 112. Second backplane 112 is connected with a router interface 114. Router interface 114 is connected by wire or pin connectors 116 with a second switch element/module 118.

Preferably, cable connectors 110 establish more connections than are required for the extant application for which switching network 100 is employed. Most preferably, cable connectors 110 establish all possible connections between connection loci 109, 111. (In order to avoid rendering FIG. 3 incomprehensibly cluttered, only an all-connection arrangement is illustrated for two connection loci 109.) By such advance provision of all connections between connection loci 109, 111 and by providing apparatuses for quickly effecting any connection changes desired (i.e., router interfaces 106, 114), the duration of any interruption to alter a connection between backplanes 108, 112 is much reduced. Opportunities for human error are similarly reduced over the prior art arrangement involving physically running cables among connection loci.

Using the teachings of the present invention, one may design a switching network for a capacity of a given number of switch modules, provide all possible cable connections between backplanes of sufficient capacity to accommodate the design number of switch modules, and initially populate the switching network with less than the maximum design number of switch modules. The cost of acquiring switch modules not initially required for the application, and wiring them into a system in which they are not required, is avoided. When, for example, a later need for additional switching capacity arises, one can then acquire and install the requisite additional switching modules. By simply changing router cards (an operation accomplished at the front of an equipment array rather than behind the safety barrier of the front board, in the insides of the switching network) one may configure the expanded system for operation.

Advantages provided by front-of-the-shelf simple rerouting/rewiring are several. In addition to the time savings and avoiding opportunities for human error mention before, some security advantages are also provided. For example, one may design specific shapes for router cards used to reroute wiring arrangements to preclude inserting incorrect cards during expansion activities. Alternatively, one may provide router modules, or cards that may be recognized by software resident within the switching network, thereby ensuring that only correct routing modules are employed during an alteration of routing within the switching network.

Figure 4:
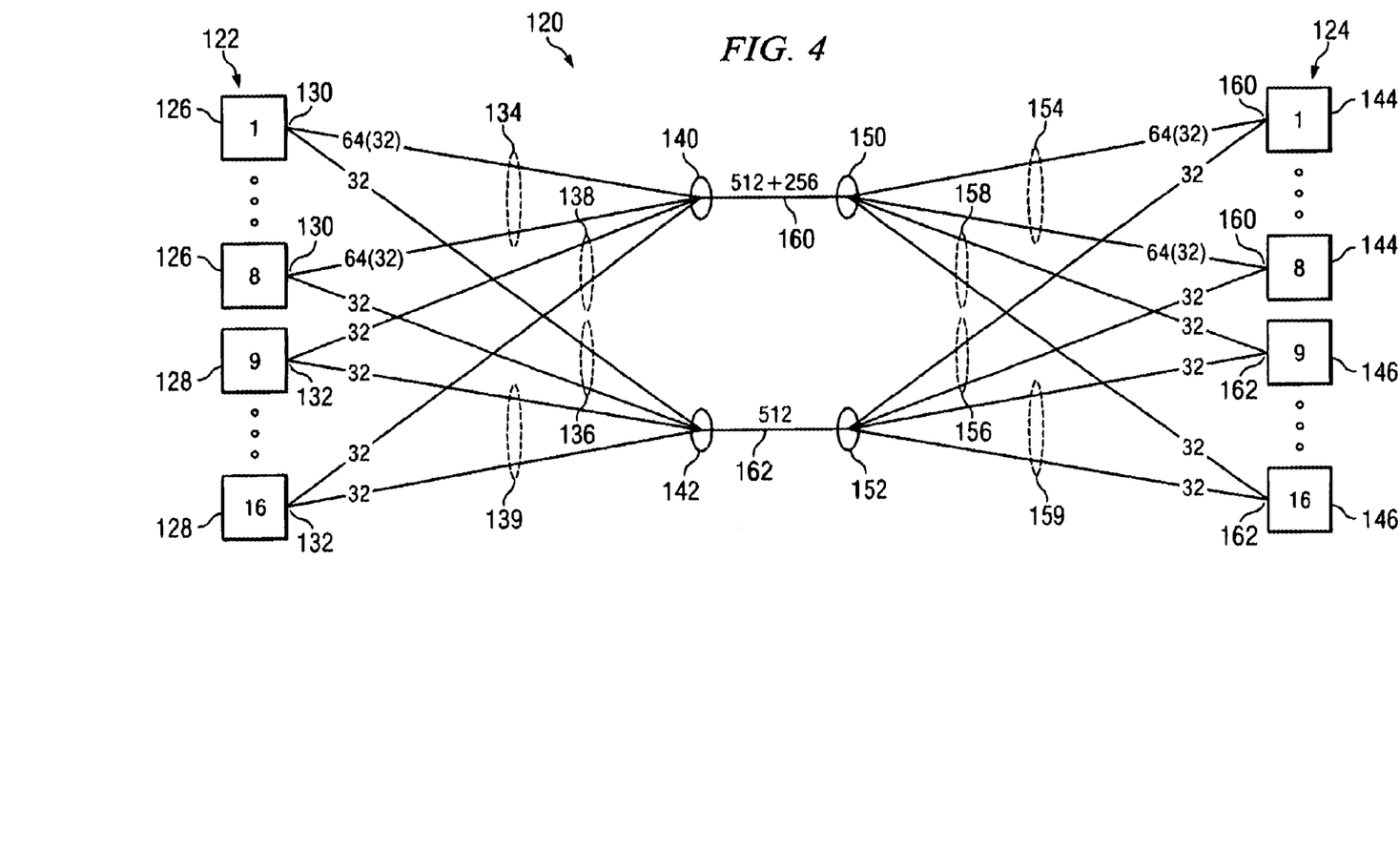
FIG. 4 is a schematic diagram illustrating advantageous employment of the present invention in a simple communication network.

FIG. 4 is a schematic diagram illustrating advantageous employment of the present invention in a simple communication network. In FIG. 4, a communication switching network 120 includes a first switching site 122 and a second switching site 124. First switching site 122 includes a group of first switches 126 and a group of second switches 128. Switches 126, 128 are connected with a connection interfaces 140 via variable connections 134. Switches 126, 128 are also connected with a connection interface 142 via variable connections 136. The term "variable" means that the connections can be changed using router interfaces, as described in connection with FIG. 3. First switches 126 include eight switches, each having 64 connection loci 130. As indicated by the number "64(32)" adjacent connection loci 130 in FIG. 4, connection loci have a capacity for 64 connections, but only 32 connections are being used for connections 134 from switches 126. Switches 126 also have a connection 136 with a connection interface 142. Connections 136 have a maximum capacity of 32 connections, all of which are used by switches 126.

Switches 128 are configured in a manner similar to the arrangement of switches 126. That is, switches 128 have connectors 138 with connection interface 140. Connectors 138 have a maximum capacity of 32 connections, all of which are used by switches 128. Switches 128 have connectors 139 with connection interface 142. Connectors 139 have a maximum capacity of 32 connections, all of which are used by switches 128.

Second switching site 124 is substantially a mirror image of first switching site 122. Second switching site 124 includes a group of third switches 144 and a group of fourth switches 146. Switches 144 are connected with a connection interface 150 via variable connections 154. Switches 144 are also connected with a connection interface 152 via variable connections 156. The term "variable" means that the connections can be changed using router interfaces as described in connection with FIG. 3. Switches 144 include eight switches, each having 64 connection loci 160. As indicated by the number "64(32)" adjacent connection loci 160, connection loci have a capacity for 64 connections, but only 32 connections are being used for connections 154 from switches 144. Switches 144 also have a connection 156 with a connection interface 152. Connections 156 have a maximum capacity of 32 connections, all of which are used by switches 144.

Switches 146 are configured in a manner similar to the arrangement of switches 144. That is, switches 146 have connectors 158 with connection interface 150. Connectors 158 have a maximum capacity of 32 connections, all of which are used by switches 146. Switches 146 also have connectors 159 with connection interface 152. Connectors 159 have a maximum capacity of 32 connections, all of which are used by switches 146.

Connection interfaces 140, 150 are connected by a common connector 160 (e.g., an electrical cable, or fiber optic cable or another multichannel connection). Connection interfaces 142, 152 are connected by a common connector 162 (e.g., an electrical cable, or fiber optic cable or another multichannel connection). Common connector 160 has a capacity for 512 [i.e., 8×64] connections to handle the maximum capacity for connection available for carriers 134, 154 at connection loci 130, 160. Common connector 160 also has an additional 256 [i.e., 8×32] connections to handle the maximum capacity for connection available for carriers 138, 158 at connection loci 132, 162. Common connector 162 has a capacity for 512 [i.e., 8×32×2] connections to handle the maximum capacity for connection available for carriers 136, 156 at connection loci 130, 160, as well as to handle the maximum capacity for connection available for carriers 139, 159 at connection loci 132, 162.

Connectors 134, 136, 138, 139, 154, 156, 158, 159 are preferably embodied in a router interface (FIG. 3) according to the teachings of the present invention. In such an advantageous arrangement the additional capacity of 256 (i.e., 32×8) connections presently unused but available on connectors 134, 154 may easily be employed when required without extensive downtime or other significant interruption in operation of communication switching network 120. Reconnecting new connection loci 130, 160 to use the remaining 256 (i.e., 32×8) connections may be accomplished by adding new router interfaces, or router cards.

Figure 5:
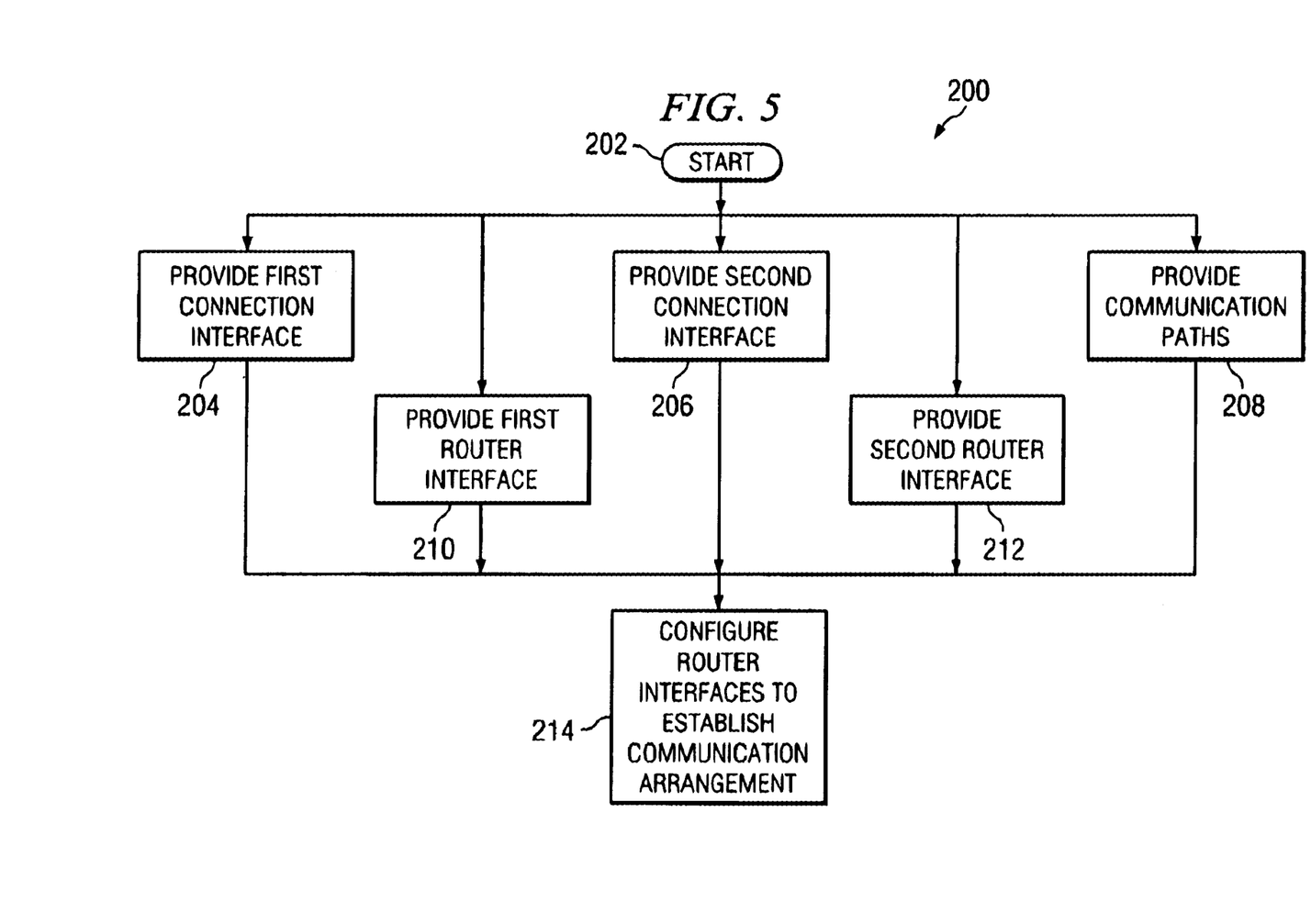
FIG. 5 is a flow chart illustrating the method of the present invention.

FIG. 5 is a flow chart illustrating the method of the present invention. In FIG. 5, a method 200 for effecting a communication arrangement between a first switch array having a plurality of first connection loci and a second switch array having a plurality of second connection loci starts, as indicated by a block 202. The communication arrangement is a plurality of communication circuits intermediate first selected connection loci and second selected connection loci. The method proceeds from start block 202 by, in no particular order: (1) providing a first connection interface having a plurality of first interconnection loci associated with the first switch array, as indicated by a block 204; (2) providing a second connection interface having a plurality of second interconnection loci associated with the second switch array, as indicated by a block 206; (3) providing a plurality of communication paths; at least equal in number to the plurality of communication circuits, intermediate the first connection interface and the second connection interface, as indicated by a block 208; (4) providing a first router interface connected with the first switch array and the first connection interface, as indicated by a block 210; and (5) providing a second router interface connected with the second switch array and the second connection interface, as indicated by a block 212. The method continues by configuring the first router interface and the second router interface to cooperate to effect a plurality of routing connections among the first selected connection loci, the second selected connection loci and selected communication paths of the plurality of communication paths to establish the communication arrangement.

It is to be understood that, while the detailed drawings and specific examples given describe preferred embodiments of the invention, they are for the purpose of illustration only, that the apparatus and method of the invention are not limited to the precise details and conditions disclosed and that various changes may be made therein without departing from the spirit of the invention which is defined by the following claims.

I claim:

1. An apparatus for effecting a communication arrangement between a first switch array having a plurality of first connection loci and a second switch array having a plurality of second connection loci; said communication arrangement being a plurality of communication circuits intermediate first selected connection loci of said plurality of first connection loci and second selected connection loci of said plurality of second connection loci; the apparatus comprising:

(a) a first connection interface associated with said first switch array; said first connection interface having a plurality of first interconnection loci;

(b) a second connection interface associated with said second switch array; said second connection interface having a plurality of second interconnection loci;

(c) a plurality of communication paths intermediate said first connection interface and said second connection interface; said plurality of communication paths being at least equal in number to said plurality of communication circuits;
(d) a first router interface connected with said first switch array and said first connection interface; and
(e) a second router interface connected with said second switch array and said second connection interface;
said first router interface and said second router interface cooperating to effect a plurality of routing connections among said first selected connection loci, said second selected connection loci and selected communication paths of said plurality of communication paths to establish said communication arrangement.

2. An apparatus for effecting a communication arrangement between a first switch array having a plurality of first connection loci and a second switch array having a plurality of second connection loci as recited in claim 1 wherein at least one of said first router interface and said second router interface comprises a plurality of router selection devices; each respective router selection device of said plurality of router selection devices affecting at least one respective selected routing connection of said plurality of routing connections.

3. An apparatus for effecting a communication arrangement between a first switch array having a plurality of first connection loci and a second switch array having a plurality of second connection loci as recited in claim 2 wherein selected respective router selection devices of said plurality of router selection devices are individually replaceable to alter said at least one respective selected routing connection.

4. An apparatus for effecting a communication arrangement between a first switch array having a plurality of first connection loci and a second switch array having a plurality of second connection loci as recited in claim 1 wherein said plurality of communication paths exceeds in number said plurality of communication circuits.

5. An apparatus for effecting a communication arrangement between a first switch array having a plurality of first connection loci and a second switch array having a plurality of second connection loci as recited in claim 2 wherein said plurality of communication paths exceeds in number said plurality of communication circuits.

6. An apparatus for effecting a communication arrangement between a first switch array having a plurality of first connection loci and a second switch array having a plurality of second connection loci as recited in claim 3 wherein said plurality of communication paths exceeds in number said plurality of communication circuits.

7. A apparatus for effecting a plurality of communication connections between at least two switching devices in a communication system; the apparatus comprising an interface array; said interface array including:
(a) a plurality of first connection loci associate d with a first switching device of said at least two switching devices;
(b) a plurality of second connection loci associated with a second switching device of said at least two switching devices; and
(c) a connection assemblage establishing said plurality of communication connections between selected first connection loci of said plurality of first connection loci and selected second connection loci of said plurality of second connection loci; said connection assemblage being configured to facilitate alteration of said communication connections among said plurality of first connection loci and said plurality of second connection loci.

8. An apparatus for effecting a plurality of communication connections between at least two switching devices in a communication system as recited in claim 7 wherein said connection assemblage comprises a first router interface device and a second router interface device connected by a plurality of communication paths; said plurality of communication paths being at least equal in number to said plurality of communication connections.

9. An apparatus for effecting a plurality of communication connections between at least two switching devices in a communication system as recited in claim 8 wherein at least one of said first router interface device and said second router interface device comprises a plurality of router selection devices; each respective router selection device of said plurality of router selection devices affecting at least one respective selected communication connection of said plurality of communication connections.

10. An apparatus for effecting a plurality of communication connections between at least two switching devices in a communication system as recited in claim 9 wherein selected respective router selection devices of said plurality of router selection devices are individually replaceable to alter said at least one respective selected communication connection.

11. An apparatus for effecting a plurality of communication connections between at least two switching devices in a communication system as recited in claim 9 wherein said plurality of communication paths exceeds in number said plurality of communication connections.

12. An apparatus for effecting a plurality of communication connections between at least two switching devices in a communication system as recited in claim 10 wherein said plurality of communication paths exceeds in number said plurality of communication connections.

13. A method for effecting a communication arrangement between a first switch array having a plurality of first connection loci and a second switch array having a plurality of second connection loci; said communication arrangement being a plurality of communication circuits intermediate first selected connection loci of said plurality of first connection loci and second selected connection loci of said plurality of second connection loci; the method comprising the steps of:
(a) in no particular order:
 (1) providing a first connection interface associated with said first switch array; said first connection interface having a plurality of first interconnection loci;
 (2) providing a second connection interface associated with said second switch array; said second connection interface having a plurality of second interconnection loci;
 (3) providing a plurality of communication paths intermediate said first connection interface and said second connection interface; said plurality of communication paths being at least equal in number to said plurality of communication circuits;
 (4) providing a first router interface connected with said first switch array and said first connection interface;
 (5) providing a second router interface connected with said second switch array and said second connection interface; and
(b) configuring said first router interface and said second router interface to cooperate to effect a plurality of routing connections among said first selected connection loci, said second selected connection loci and selected communication paths of said plurality of communication paths to establish said communication arrangement.

14. A method for effecting a communication arrangement between a first switch array having a plurality of first connection loci and a second switch array having a plurality of second connection loci as recited in claim 13 wherein at least one of said first router interface and said second router interface comprises a plurality of router selection devices; each respective router selection device of said plurality of router selection devices affecting at least one respective selected routing connection of said plurality of routing connections.

15. A method for effecting a communication arrangement between a first switch array having a plurality of first connection loci and a second switch array having a plurality of second connection loci as recited in claim 14 wherein selected respective router selection devices of said plurality of router selection devices are individually replaceable to alter said at least one respective selected routing connection.

16. A method for effecting a communication arrangement between a first switch array having a plurality of first connection loci and a second switch array having a plurality of second connection loci as recited in claim 13 wherein said plurality of communication paths exceeds in number said plurality of communication circuits.

17. A method for effecting a communication arrangement between a first switch array having a plurality of first connection loci and a second switch array having a plurality of second connection loci as recited in claim 14 wherein said plurality of communication paths exceeds in number said plurality of communication circuits.

18. A method for effecting a communication arrangement between a first switch array having a plurality of first connection loci and a second switch array having a plurality of second connection loci as recited in claim 15 wherein said plurality of communication paths exceeds in number said plurality of communication circuits.

* * * * *